United States Patent [19]

Strickler et al.

[11] Patent Number: 5,152,356
[45] Date of Patent: Oct. 6, 1992

[54] WEIGHING SCALE WITH COVER OPERATING MEANS

[75] Inventors: Ernst Strickler, Wolfhausen; Karl Bertsch, Uster, both of Switzerland

[73] Assignee: Mottler-Toledo AG, Greifensee, Switzerland

[21] Appl. No.: 691,409

[22] Filed: Apr. 25, 1991

[30] Foreign Application Priority Data

May 23, 1990 [CH] Switzerland ............... 1756/90

[51] Int. Cl.⁵ ............................................. G01G 21/28
[52] U.S. Cl. ............................................. 177/180
[58] Field of Search ......................... 177/180–182

[56] References Cited

U.S. PATENT DOCUMENTS

| | | | |
|---|---|---|---|
| 2,732,199 | 1/1956 | Meinig | 177/181 |
| 4,762,190 | 8/1988 | Meixner | 177/181 |
| 4,789,034 | 12/1988 | Luechinger et al. | 177/181 |
| 4,798,250 | 1/1989 | Knothe et al. | 177/181 |
| 4,979,579 | 12/1990 | Dardat et al. | 177/180 |

FOREIGN PATENT DOCUMENTS 216035  4/1987  European Pat. Off. .

*Primary Examiner*—George H. Miller, Jr.
*Attorney, Agent, or Firm*—Lawrence E. Laubscher, Sr.

[57] ABSTRACT

The cover for the weighing pan of an electronic scale is rotationally driven between closed and open positions relative to a housing by a friction drive arrangement including a clutch disc (37) and a friction disc (47). The motor drive is transmitted directly to the cover without any slippage. The cover may be rotated between its open and closed positions relative to the housing either manually (by overcoming the friction of the drive means) or by means of an electric drive motor. A control arrangement including contact fingers (19) and corresponding circular segment tracks (57) serve to monitor the position of the cover relative to the housing.

6 Claims, 1 Drawing Sheet

WEIGHING SCALE WITH COVER OPERATING MEANS

REFERENCE TO RELATED APPLICATIONS

This is a companion application to the prior U.S. application of Ernst Strickler Ser. No. 07/641,713 filed Jan. 15, 1991, entitled "Electronic Weighing Apparatus Having Protective Cover Means".

1. Field of the Invention

This invention relates to friction drive means for displacing the protective cover of an electronic weighing scale between open and closed positions relative to a housing, thereby to afford manual or motor-driven access for loading and unloading a weighing scale pan.

2. Brief Description of the Prior Art

Current analysis scales commonly include closable weighing chambers that are accessible for loading a weighing pan by shifting a weighing chamber wall or, in the case of cylindrical weighing chambers, by rotating a part of the cylindrical weighing chamber wall. To make the weighing operation easier, especially for a series of weighing operations, rectangular weighing chamber walls are opened or closed by means of an electrical drive. To make sure that a weighing chamber wall, provided with a motor drive, can also be shifted by hand, it must be possible to disconnect the weighing chamber wall drive.

In the European Patent Application No. 0216035, a drive for a rectangular weighing chamber wall is provided where the friction wheel for driving the weighing chamber wall is lifted off the surface of the weighing chamber wall when the drive motor is at a standstill. For this purpose, the shaft upon which the friction wheel is arranged is so guided in an arc-shaped groove that, upon a rotary motion of the wheel, the latter will, as the shaft rolls off the arc-shaped groove, be guided against the weighing chamber wall and, as the shaft stands still, is lifted off the wall by a spring. Such a device is expensive and its operational reliability depends on the surface conformation of the shaft and the groove, the angle between the groove and the weighing chamber wall, as well as the resilient force of the spring.

SUMMARY OF THE INVENTION

The primary object of the present invention is to provide a motor-driven friction drive arrangement for rotationally displacing a cylindrical cover between open and closed positions relative to a housing, thereby affording reliable disconnection of the drive means from the cover in the event that manual override is desired.

In accordance with a more specific object of the invention, the bottom wall of the cylinder-like weighing chamber cover is connected with a friction disc that is pressed against a clutch disc that is in working connection with the drive motor. With the arrangement of the friction clutch according to the invention, it is possible, on the one hand, to rotate the weighing chamber wall by hand, without any disturbing forces or moments being transmitted to the drive motor, and, on the other hand, to keep the drive output of the drive motor and thus the latter's inevitable heat radiation very small because, as the weighing chamber wall is rotated by motor, the clutch works in a force-locking manner.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 3:
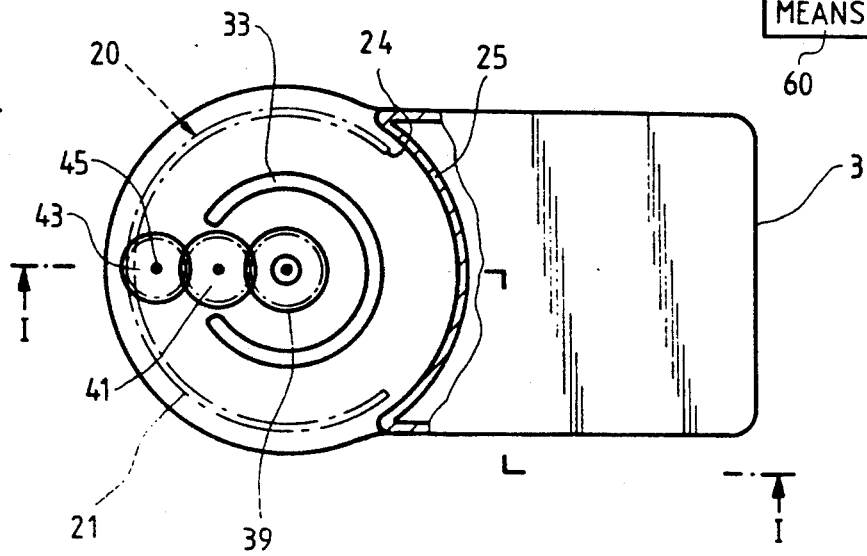
FIG. 3 is a sectional view taken along line III—III of FIG. 2.

Referring now to the drawings, the electronic weighing apparatus 1 includes a housing 3 having a lower base portion 9 and an upper base portion 3a. A weighing pan 11 is supported by a support arm 13 having a vertical portion 13a that extends upwardly through an opening 31 contained in the top wall 29 of the lower housing portion 9. The arm 13 is connected with conventional load measuring means (not shown). The weighing pan 11 is contained in a chamber 5 defined within a protective cover member 20 having a cylindrical side wall 21 containing a sector-shaped opening 24, as shown in FIG. 3. When the cover is in the closed position illustrated in FIG. 3, the sector-shaped access opening 24 is opposite a concave closure side wall 25 formed in the upper housing portion 3a. The housing 3 is supported by adjustable leveling legs 27, as is known in the art.

Figure 1:
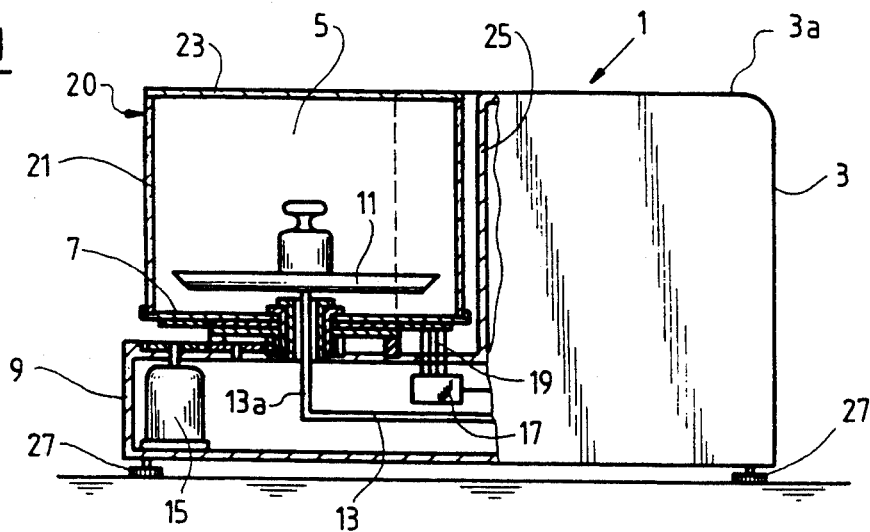
FIG. 1 is a partly sectional side elevational view of the weighing apparatus of the present invention taken along line I—I of FIG. 3.
Figure 2:
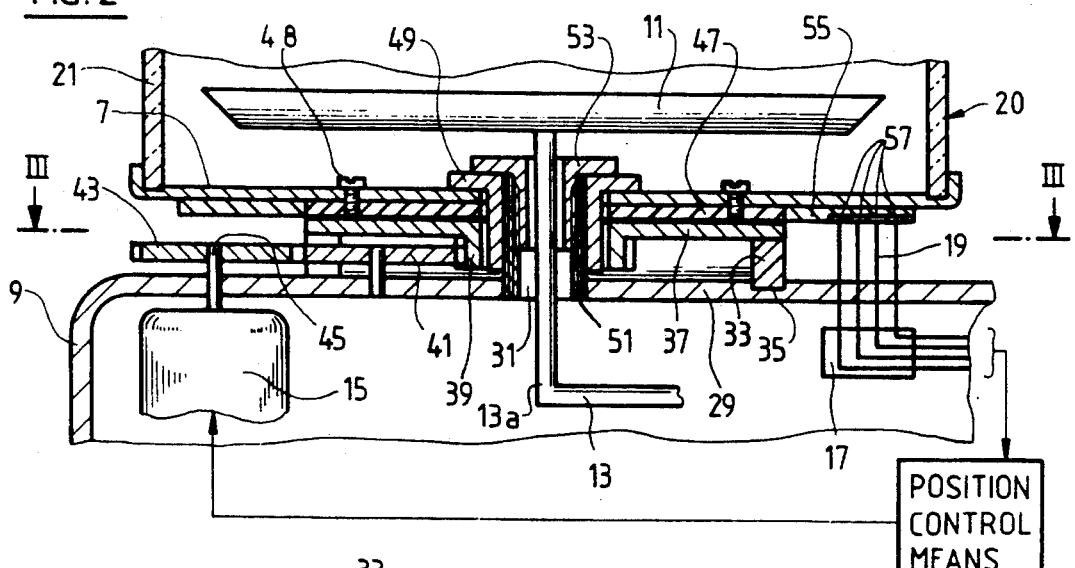
FIG. 2 is a detailed sectional view of the cover drive means.

Referring more particularly to FIG. 2, the bottom wall 7 of the cover member 20 is bolted by bolts 48 to the upper surface of a friction disc 47, which is arranged for cooperation with the annular clutch drive disc 37 having a downwardly depending pinion gear 39. Drive motor 15 supported by the housing lower portion 9 is operable to rotatably drive the cover member by a gear train including the drive pinion 43 mounted on the motor shaft 45, intermediate gear 41, and the drive pinion 39.

In order to adjust the frictional force between the friction disc 47 and the clutch disc 37, an adjusting nut 49 is provided having a flange portion that engages the upper surface of the cover bottom wall 7, and a internally threaded tubular portion that is threadably connected with the upper end of an externally threaded stud 51, the lower end of which is rigidly connected with the opening 31 contained in the housing top wall 29. Thus, by threadably rotating the nut 49 relative to the stud 51, the frictional force between the friction disc 47 and the clutch 37 may be adjusted. In order to lock the adjusting nut 49 in place, a locking nut 53 is provided having a flange portion that engages the upper flange portion of the adjusting nut 49, and an externally threaded tubular portion that is threadably connected with the internal surface of the tubular stud 51. Consequently, after the adjusting nut 49 has been longitudinally displaced relative to stud 51 as desired, locking nut 53 is rotated to lock the adjusting nut in place.

In order to monitor the position of the cover 20 relative to the housing 3, annular tracks 57 are provided on the lower surface of the cover bottom wall 7 for engagement by contact fingers 19 mounted on the housing lower top wall portion 29, as shown in FIG. 2. The fingers are connected with a position scanning device 17 which in turn is connected with position control means 60 that control the operation of motor 15.

The adjusting nut 49 is so adjusted relative to the stud 51 that the frictional drive force between the drive motor 15 and the cover 20 may be adjusted for manual override, whereby the cover member 20 may be rotated from its closed position to its open position for access to the weighing chamber 5 via the access opening 24.

The clutch disc 37 of the friction drive means is rotatably supported by a stationary slide ring segment 33 that is supported in a corresponding groove 35 formed in the upper surface of the top wall 29 of the housing lower portion 9, as shown in FIG. 2.

Operation

In operation, if the weighing chamber wall 21 is made to rotate by means of electric motor 15, then the latter's drive moment is transferred via gear 43 to intermediate gear 41 and, from the latter, to the pinion 39 of clutch disc 37. Clutch disc 37 transmits the rotation in a friction-locking manner to friction disc 47 that is firmly connected with bottom 7 of weighing chamber 5 and causes the latter to rotate along with the rest.

If weighing chamber wall 21 is rotated by hand, then friction disc 47 slides upon clutch disc 37, whereby the latter stands still as a result of the self-inhibition of the tooth wheel gear. Depending on the magnitude of the friction coefficient of the material of the clutch disc 37 and friction disc 47, one gets more or less resistance when weighing chamber 5 is rotated by hand.

The frictional force between weighing chamber 5 and the electrical drive facilitates not only manual operation but in addition serves also as an overload protection means for electric motor 15 when the latter is set in motion and weighing chamber wall 21 is—for whatever reason—prevented from rotating. The particular angular position of opening 24 of weighing chamber wall 21 is continually scanned by the contact shoes 19. This is done both during rotation of weighing chamber 5 by hand and by electric motor 15 and makes it possible that, upon the command "close," weighing chamber wall 21 will always be rotated by the angle that is correct for complete closing, independently of the position at the start of the closing or opening commands.

While the preferred form and embodiment has been illustrated and described, changes may be made without deviating from the inventive concepts set forth above.

What is claimed is:

1. Electronic weighing apparatus (1), comprising:
    (a) a housing (3) including a lower base portion (9) having a horizontal top wall (29) containing an opening (31);
    (b) a weighing pan (11);
    (c) load support means connecting said weighing pan for vertical movement relative to said housing base portion, said load support means including a support arm (13) having a vertical carrier arm portion (13a) extending through said opening, said support arm being connected at its upper end with said weighing pan;
    (d) protective cover means at least partially enclosing said weighing pan, said cover means including:
        (1) a cover member (20) having a bottom wall (7), a generally cylindrical vertical side wall (21), and a horizontal top wall (23), said side wall containing a sector-shaped access opening (24), said bottom wall containing an opening aligned with said housing opening and through which said vertical carrier arm portion extends; and
        (2) means supporting said cover member for rotation about its vertical axis between closed and open positions relative to said housing, said housing further including an upper portion (3a) having a vertical concave side wall portion (25) that is the sector of a cylinder, said concave side wall portion being concentrically arranged relative to said cover side wall portion, the sector angle of said housing side wall portion being greater than that of said cover access opening, whereby when said cover is in its closed position, said access opening is closed by said closure wall portion; and
    (e) friction drive means (37,47) for displacing said cover member between its closed and open positions relative to said housing.

2. Apparatus as defined in claim 1, wherein said friction drive means includes an annular friction disc (47) fastened to the cover bottom wall concentrically about said bottom wall opening, and an annular clutch drive disc (37) supported by said housing coaxially with said friction disc for driving engagement therewith, said clutch disc including a driven pinion (39) arranged concentrically about said carrier arm portion.

3. Apparatus as defined in claim 2, and further including a slide ring segment (33) mounted on said housing top wall concentrically about said top wall opening for supporting said clutch disc for rotation relative to said housing.

4. Apparatus as defined in claim 3, wherein said drive means further includes a motor (15) connected with said housing, a drive pinion (43) driven by said motor, and at least one intermediate gear (41) connecting said drive pinion with said driven pinion.

5. Apparatus as defined in claim 1, and further including locking means for locking said nut in place relative to said stud, said locking means including a tubular locking nut (53) having a flange portion adapted to seat upon said adjusting nut flange portion, and a threaded portion extending downwardly within, and threadably connected with, the internal wall surface of said stud.

6. Apparatus as defined in claim 1, and further including position control means (60) for controlling the position of said cover relative to said housing, said position control means including electrically conductive concentrically arranged contact tracks (57) mounted on the lower surface of said cover bottom wall concentrically about the opening contained therein, and contact fingers (19) connected with said housing for engagement with said tracks, said fingers being electrically connected with the control means of said drive motor, whereby the cover may be accurately displaced between its open and closed positions.

* * * * *